US011938481B2

(12) United States Patent
Liu et al.

(10) Patent No.: US 11,938,481 B2
(45) Date of Patent: Mar. 26, 2024

(54) MICROFLUIDIC SUBSTRATE, MICROFLUIDIC CHIP AND MICRO TOTAL ANALYSIS SYSTEM

(71) Applicant: BOE TECHNOLOGY GROUP CO., LTD., Beijing (CN)

(72) Inventors: Qingzhao Liu, Beijing (CN); Shuilang Dong, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 618 days.

(21) Appl. No.: 17/256,077

(22) PCT Filed: Jun. 3, 2020

(86) PCT No.: PCT/CN2020/094124
§ 371 (c)(1),
(2) Date: Dec. 24, 2020

(87) PCT Pub. No.: WO2020/248881
PCT Pub. Date: Dec. 17, 2020

(65) Prior Publication Data
US 2021/0268505 A1 Sep. 2, 2021

(30) Foreign Application Priority Data

Jun. 10, 2019 (CN) .......................... 201910497302.7

(51) Int. Cl.
*G01N 21/59* (2006.01)
*B01L 3/00* (2006.01)

(52) U.S. Cl.
CPC ... *B01L 3/502784* (2013.01); *B01L 3/502715* (2013.01); *G01N 21/59* (2013.01);
(Continued)

(58) Field of Classification Search
CPC ......... B01L 3/50273; B01L 2300/0645; B01L 2300/0887; B01L 2300/165;
(Continued)

(56) References Cited

U.S. PATENT DOCUMENTS

2009/0254289 A1* 10/2009 Vivek ................... B06B 1/0622
702/54
2018/0214874 A1* 8/2018 Koksal .................. G01N 29/22
(Continued)

FOREIGN PATENT DOCUMENTS

CN 102650512 A 8/2012
CN 102896007 A 1/2013
(Continued)

OTHER PUBLICATIONS

China Patent Office, CN201910497302.7 First Office Action dated Apr. 20, 2021 and the English translation thereof.
(Continued)

*Primary Examiner* — Isiaka O Akanbi
(74) *Attorney, Agent, or Firm* — HOUTTEMAN LAW LLC

(57) ABSTRACT

The present disclosure provides a microfluidic substrate, a microfluidic chip and a micro total analysis system. The microfluidic substrate includes a substrate and an ultrasonic structure on the substrate. The ultrasonic structure is configured to generate ultrasonic waves during a droplet splitting process to vibrate a droplet.

13 Claims, 2 Drawing Sheets

(52) U.S. Cl.
CPC .............. *B01L 2300/0627* (2013.01); *B01L 2300/0645* (2013.01); *B01L 2300/161* (2013.01); *B01L 2400/0439* (2013.01)

(58) Field of Classification Search
CPC ....... B01L 2400/0439; B01L 3/502792; B01L 2200/0673; B01L 2300/0816; B01L 3/5027; B01L 2200/10; B01L 2300/0861
USPC ........................................................ 356/440
See application file for complete search history.

(56) References Cited

U.S. PATENT DOCUMENTS

| | | | |
|---|---|---|---|
| 2019/0105655 A1* | 4/2019 | Dong | B01L 3/502792 |
| 2019/0366332 A1* | 12/2019 | Zhang | B01L 3/50273 |

FOREIGN PATENT DOCUMENTS

| | | |
|---|---|---|
| CN | 107670711 A | 2/2018 |
| CN | 108465491 A | 8/2018 |
| CN | 108704682 A | 10/2018 |
| CN | 109107619 A | 1/2019 |
| CN | 109731621 A | 5/2019 |
| NL | 1026321 C2 | 12/2005 |

OTHER PUBLICATIONS

Songjing Li, "Research Development and Application of Droplet-based" issued on Jun. 2013 and the English translation thereof, China Academic Journal Electronic Publishing House.

Sung Kwon Cho, et al., "Particle Separation and Concentration Control" issued on Jan. 2003, Mechnical and Aerospace Engineering Department, University of California.

* cited by examiner

MICROFLUIDIC SUBSTRATE, MICROFLUIDIC CHIP AND MICRO TOTAL ANALYSIS SYSTEM

CROSS REFERENCE TO RELATED APPLICATIONS

This is a National Phase Application filed un 35 U.S.C. 371 as a national stage of PCT/CN2020/094124, filed on Jun. 3, 2020, an application claiming priority to Chinese patent application No. 201910497302.7, filed on Jun. 10, 2019, the disclosure of which is incorporated herein by reference.

TECHNICAL FIELD

The present disclosure belongs to the field of microfluidic technology, and particularly relates to a microfluidic substrate, a microfluidic chip, and a micro total analysis system.

BACKGROUND

Micro total analysis systems (μTASs) are designed to transfer functions of an analytical laboratory to portable analytical devices, to the largest extent, even to integrate these functions in a chip with a small size, by miniaturization and integration of chemical analytical devices. The ultimate goal is to realize the important technical basis of the development of personalized and household analysis laboratories, especially the personalized medicine of the system medicine.

SUMMARY

As an aspect, the present disclosure provides a microfluidic substrate, including a substrate and an ultrasonic structure on the substrate. The ultrasonic structure is configured to generate ultrasonic waves during a splitting process of a droplet to vibrate the droplet.

In an embodiment, the ultrasonic structure includes a first electrode layer and a material layer that are arranged in sequence in a direction away from the substrate; and the material layer is configured to generate the ultrasonic waves when a first voltage is applied to the first electrode layer.

In an embodiment, the first electrode layer includes a plurality of first electrodes spaced apart from each other.

In an embodiment, the microfluidic substrate further includes a second electrode layer on the substrate. The second electrode layer includes a plurality of second electrodes spaced apart from each other, and the plurality of second electrodes are configured to, when being applied with a second voltage, control the droplet on a corresponding second electrode to be split.

In an embodiment, the plurality of first electrodes and the plurality of second electrodes are in a same layer, are made of a same material, and are alternately arranged.

In an embodiment, the second electrode layer is between the first electrode layer and the substrate.

In an embodiment, the material layer includes polytetrafluoroethylene.

In an embodiment, the material layer includes vinylidene fluoride (VDF) homopolymer.

In an embodiment, the material layer includes a copolymer of vinylidene fluoride and fluorine-containing vinyl monomer In an embodiment, each of the plurality of second electrodes is coupled to a first switching device.

In an embodiment, the microfluidic substrate further includes a detection device on a side of the second electrode layer close to the substrate and a second switching device coupled to the detection device, the detection device being configured to detect light passing through the droplet.

In an embodiment, each of the first switching device and the second switching device is an oxide thin film transistor, a film layer of the first switching device and a respective film layer of the second switching device are in a same layer and are made of a same material.

In an embodiment, the microfluidic substrate further includes a lyophobic layer on a side of the ultrasonic structure away from the substrate.

In an embodiment, each of the plurality of second electrodes is coupled to a first signal line and each of the plurality of first electrodes is coupled to a second signal line, and the first signal line and the second signal line are in a same layer and are made of a same material.

As another aspect, the present disclosure provides a microfluidic chip, including the microfluidic substrate described in the embodiments of the present disclosure and a lower substrate. The droplet is accommodated between the microfluidic substrate and the lower substrate, the microfluidic substrate further includes an optical device configured to generate light towards the droplet; and the lower substrate includes a detection device configured to detect the light passing through the droplet.

As another aspect, the present disclosure provides a microfluidic chip, including the microfluidic substrate described in the embodiments of the present disclosure and an upper substrate. The droplet is accommodated between the microfluidic substrate and the upper substrate, the upper substrate includes an optical device configured to generate light towards the droplet; and the microfluidic substrate further includes a detection device configured to detect the light passing through the droplet.

As another aspect, the present disclosure provides a micro total analysis system, including the microfluidic chip described in the embodiments of the present disclosure.

DETAILED DESCRIPTION

To make those skilled in the art better understand the technical solutions of the present disclosure, the present disclosure will be further described in detail with reference to the accompanying drawings and the specific embodiments.

At present, by using the dielectric wetting principle, the surface tension between a surface of a droplet and a solid (for example, a dielectric layer or a lyophobic layer directly contacting the droplet) is changed by adjusting an electric field between an upper substrate and a lower substrate of a microfluidic chip in a micro total analysis system, so as to change a contact angle between the surface of the droplet and the solid, thereby realizing the operation and control of the droplet.

It has been found that at least the following problems exist in the existing art: the voltage for controlling the splitting of the droplet by the microfluidic chip is usually too high, and the voltage is generally more than 100 volts, which places higher requirements on the high-voltage-resistance performance of a switching device in the microfluidic chip, and the difficulty of the manufacturing process of the microfluidic chip is increased.

Figure 1:
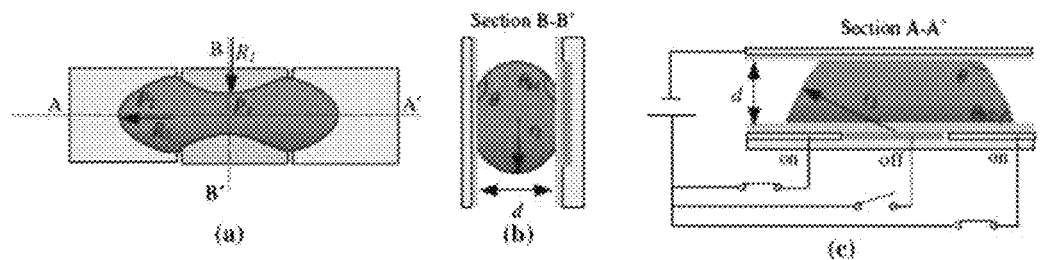
FIG. 1 is a schematic diagram of a droplet splitting process.

In the micro total analysis system, the contact angle between the droplet and the upper and lower substrates is changed by adjusting the electric field between the upper and lower substrates of the microfluidic chip, so as to control the droplet to move to a designated position or split the droplet. The light emitted from the light source to the light guide can be split into vertical light rays with different wavelengths through the light guide and then emitted from a designated position. The detection device detects light passing through the droplet at a designated position, thereby analyzing data such as the position, chemical composition, and molecular composition of the droplet. FIG. 1 is a schematic diagram of a droplet splitting process. FIG. 1 (a) shows a plan view at the time of splitting the droplet, FIG. 1 (b) shows a cross-sectional view taken along line BB' of FIG. 1 (a), and FIG. 1 (c) shows a cross-sectional view taken along line AA' of FIG. 1 (a). Referring to FIG. 1, in the droplet splitting process, when a droplet is positioned on three driving electrodes (corresponding to the second electrodes in the embodiment) of a lower substrate of the microfluidic chip, the electrodes at two ends are charged and the middle electrode is not charged by controlling switching devices coupled to the driving electrodes (see, FIG. 1 (c)). Due to the dielectric wetting effect, the lyophilicity of the dielectric layers on the charged electrodes at the two ends is increased, so that the contact angle between the droplet and the lower substrate is reduced, the curvature radius of the droplet is increased, and the droplet moves to the charged electrodes at the two ends. Since the middle electrode is not charged, and the volume of the droplet is constant in the process, the middle part of the droplet is stretched until the droplet is pulled apart, and finally the splitting of the droplet is realized. The voltage for controlling the splitting of the droplet in an existing micro total analysis system is generally more than 100 volts, and the driving electrode is usually required to be coupled with a switching device such as a thin film transistor to realize control function, however, the thin film transistor in the existing art generally cannot withstand high voltage of 80 volts or more, the requirement on the voltage of 100 volts for controlling the splitting of the droplet cannot be met, and therefore the excessive voltage for splitting becomes an important factor for restricting the development of the micro total analysis system. The microfluidic substrate, the microfluidic chip and the micro total analysis system provided by the embodiments of the present disclosure aim to solve the problem of excessive voltage for controlling the splitting of the droplet in the existing art.

Figure 2:
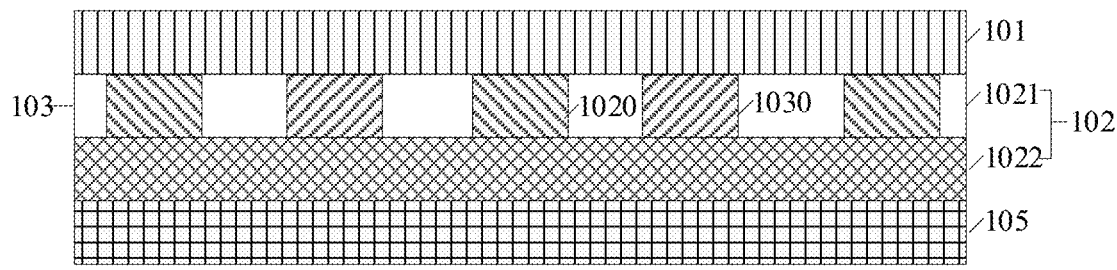
FIG. 2 and FIG. 3 are schematic structural diagrams of a microfluidic substrate according to an embodiment of the present disclosure.

An embodiment of the present disclosure provides a microfluidic substrate. FIG. 2 is a schematic structural diagram of the microfluidic substrate according to the embodiment of the present disclosure, and as shown in FIG. 2, the microfluidic substrate includes: a substrate 101 and an ultrasonic structure 102 located on the substrate 101. In an embodiment, the ultrasonic structure 102 is configured to generate ultrasonic waves during a splitting process of a droplet to vibrate the droplet.

According to the microfluidic substrate provided by the embodiment of the disclosure, ultrasonic waves are generated at a specified position through the ultrasonic structure 102, and the thermal motion of molecules of the droplet is increased by using the directional ultrasonic waves, so that the molecules on the surface of the droplet and the molecules inside the droplet are exchanged, and the higher surface energy of the molecules on the surface of the droplet is destroyed to a certain extent, so that the molecules on the surface of the droplet are in an unstable state. Therefore, the difficulty of splitting the droplet can be reduced, so that the droplet can be controlled to be split without being applied an excessive voltage, the voltage for splitting the droplet is further reduced, and the energy consumption required by splitting the droplet is saved.

In an embodiment, the ultrasonic structure 102 includes: a first electrode layer 1021 and a material layer 1022 that are arranged in sequence in a direction away from the substrate 101; in an embodiment, the material layer 1022 is configured to generate ultrasonic waves when a voltage is applied to the first electrode layer 1021.

It should be noted that the material layer 1022 of the ultrasonic structure 102 is made of a material having piezoelectricity (for example, a piezoelectric film), and is attached to the first electrode layer 1021. When a voltage is applied to the first electrode layer 1021, ultrasonic waves can be generated at a specified position of the material layer 1022, so that surface molecules and internal molecules of the droplet are exchanged, and higher surface energy of the surface of the droplet is damaged, thereby reducing the difficulty of splitting the droplet, promoting the splitting of the droplet, which in turn reduces the voltage for splitting the droplet.

In an embodiment, the first electrode layer 1021 includes a plurality of first electrodes 1020 disposed at intervals. In an embodiment, the plurality of first electrodes 1020 may be disposed in the material layer 1022 and spaced apart from each other by the material layer 1022. In an embodiment, referring to FIG. 3, a portion of the first electrode layer 1021 insulating the plurality of first electrodes 1020 from each other may include the same material as the material layer 1022.

In should be noted that, the material layer 1022 is made of a material having piezoelectricity, and when a voltage is applied to a certain position of the first electrode layer 1021 attached to the material layer 1022, a directional ultrasonic wave is generated at a corresponding position of the material layer 1022, so that the droplet to be split vibrates, thereby promoting the splitting of the droplet. Since the ultrasonic waves are generated only at a specified position of the material layer 1022 in the droplet splitting process, and the ultrasonic waves are not generated on the entire surface of the material layer 1022, a plurality of first electrodes 1020 may be disposed in the first electrode layer 1021, and the plurality of first electrodes 1020 are arranged at intervals. When directional ultrasonic waves need to be generated, voltage only needs to be applied to one or more first electrodes 1020, so that the position where the ultrasonic waves are generated can be more accurate. Meanwhile, only one or more first electrodes 1020 are applied with the voltage, so that energy waste caused by applying voltage to the whole first electrode layer 1021 can be avoided, and the effect of saving energy consumption can be realized.

In an embodiment, the microfluidic substrate may be an upper substrate in a microfluidic chip, and the microfluidic substrate includes: a substrate 101, an ultrasonic structure 102 and a second electrode layer 103 on the substrate; the ultrasonic structure 102 may adopt the ultrasonic structure described above, i.e., including the first electrode layer 1021 and the material layer 1022 disposed on the substrate 101; in particular, the first electrode layer 1021 includes a plurality of first electrodes 1020 spaced apart from each other, and the second electrode layer 103 includes a plurality of second electrodes 1030 spaced apart from each other; and the first electrodes 1020 and the second electrodes 1030 are arranged in a same layer, are made of a same material, and are alternately arranged.

In an embodiment, the second electrode 1030 may be used as a driving electrode to drive the droplet to move and be split.

It should be noted that the second electrode 1030 may be a planar electrode or a strip electrode. In an embodiment of the present disclosure, the first electrodes 1020 in the first electrode layer 1021 are strip electrodes, and the plurality of first electrodes 1020 are disposed at intervals, so that the ultrasonic waves can be precisely generated at a specified position. In a case where the first electrodes 1020 in the first electrode layer 1021 and the second electrodes 1030 in the second electrode layer 103 may be disposed in a same layer, the second electrode 1030 is also a strip electrode, and the plurality of second electrodes 1030 are also disposed at intervals and alternately disposed with the first electrodes 1020. In this case, the first and second electrodes 1020 and 1030 disposed in the same layer can reduce the thickness of the microfluidic substrate. In addition, the second electrodes 1030 and the first electrodes 1020 are made of the same material and can be made at the same time, so that the difficulty of the manufacturing process is reduced.

As used herein, the term "in the same layer" refers to the relationship between layers formed simultaneously in the same step. In one example, when the first electrodes 1020 and the second electrodes are formed as a result in one or more steps of the same patterning process performed in the same material layer, they are in the same layer. In another example, the first electrodes 1020 and the second electrodes 1030 may be formed in the same layer by simultaneously performing the step of forming the first electrodes 1020 and the step of forming the second electrodes 1030. For example, the first and second electrodes 1020 and 1030 are at the same level and have the same thickness.

Figure 3:
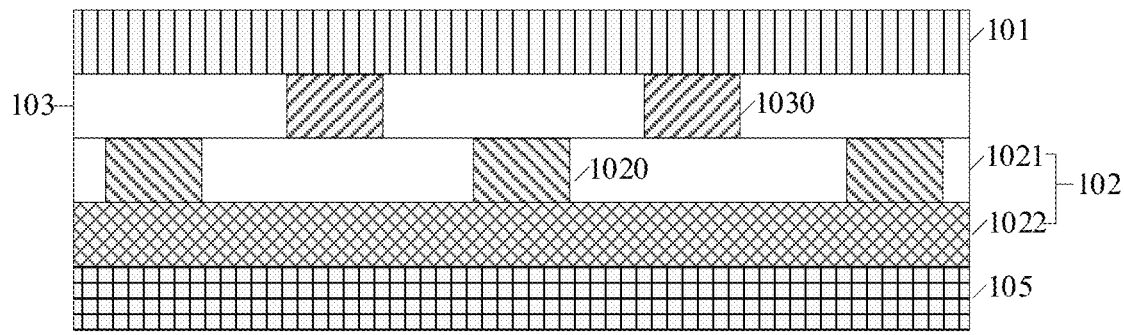

In an embodiment, the first electrodes 1020 in the first electrode layer 1021 and the second electrodes 1030 in the second electrode layer 103 may also be disposed in different layers, as shown in FIG. 3, an insulating layer is disposed between the first electrode layer 1021 and the second electrode layer 103, and in this case, the first electrode 1020 in the first electrode layer 1021 may also be a planar electrode. It can be understood that the first electrodes 1020 and the second electrodes 1030 are disposed in different layers, which can avoid the problem of excessive wiring density caused by disposing the second electrodes 1030 and the first electrodes 1020 in the same layer, thereby reducing the difficulty of wiring.

In an embodiment, the material of the material layer 1022 includes polytetrafluoroethylene.

It should be noted that the material of the material layer 1022 in the embodiment of the present disclosure has piezoelectricity, and when a certain voltage is applied thereto, ultrasonic waves can be generated to promote the splitting of the droplet. The material of the material layer 1022 may be vinylidene fluoride (VDF) homopolymer, or a copolymer of vinylidene fluoride and other small amount of fluorine-containing vinyl monomer (such as trifluoroethylene (TrFE), chlorotrifluoroethylene (CTFE), or tetrafluoroethylene (TFE)). In a particular example, the material of the material layer 1022 in embodiment of the present disclosure is polytetrafluoroethylene. Of course, the material of the material layer 1022 may be other materials as mentioned above in practical applications, and will not be described in detail here.

Figure 4:
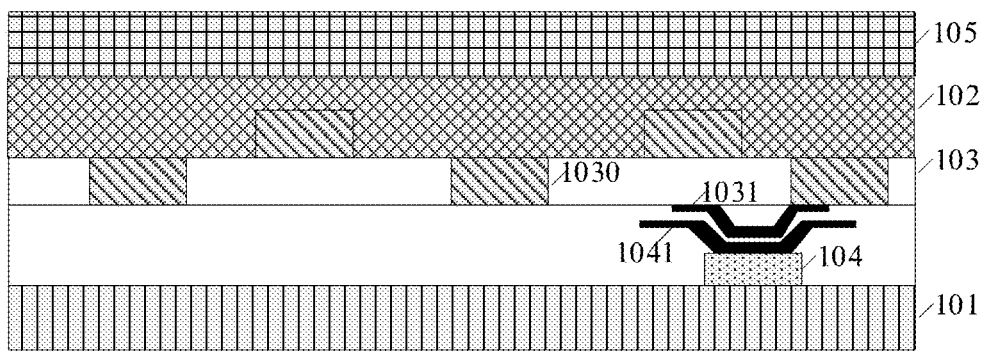
FIG. 4 is a schematic structural diagram of another microfluidic substrate according to an embodiment of the present disclosure.

FIG. 4 is a schematic structural diagram of another microfluidic substrate according to an embodiment of the present disclosure. As shown in FIG. 3, the microfluidic substrate may be a lower substrate of a microfluidic chip; the microfluidic substrate includes a substrate 101, an ultrasonic structure 102 and a second electrode layer 103 arranged on the substrate 101. The ultrasonic structure 102 may adopt the ultrasonic structure described above. The second electrode layer 103 of the microfluidic substrate includes a plurality of second electrodes 1030 disposed at intervals; and each second electrode 1030 is coupled to a first switching device 1031 corresponding thereto.

It should be noted that the second electrodes 1030 may be strip electrodes, and some of the second electrodes 1030 may be powered and some of the second electrodes 1030 may not be powered, so that a contact angle between the droplet and the microfluidic substrate is changed, and the splitting of the droplet is controlled. For example, as shown in FIG. 1, for three adjacent second electrodes on which a droplet is present, the splitting of the droplet may be achieved by not powering the middle second electrode and powering the second electrodes on the two ends.

The second electrodes 1030 in the microfluidic substrate provided by the embodiment of the present disclosure are arranged at intervals, and each second electrode 1030 is coupled to a corresponding one of first switching devices 1031. Individual control of the respective second electrodes 1030 may be achieved by switching the first switching devices 1031 on and off. When the second electrodes 1030 at the two ends covered by the droplet are charged and the second electrode 1030 in the middle is not charged, due to the dielectric wetting effect, the lyophilicity of the dielectric layers on the charged electrodes at the two ends is increased, so that the contact angle between the droplet and the lower substrate is reduced, the curvature radius of the droplet is increased, and the droplet moves to the charged electrodes at the two ends. Since the middle electrode is not charged and the volume of the droplet is constant in the process, the middle part of the droplet is stretched until the droplet is pulled apart, and the splitting of the droplet is finally realized.

As shown in FIG. 4, in addition to the substrate 101, the ultrasonic structure 102, and the second electrode layer 103, the microfluidic substrate further includes a detection device 104 at a side of the second electrode layer 103 close to the substrate 101 and a second switching device 1041 coupled to the detection device 104.

It should be noted that the detection device 104 can analyze data such as the position, chemical composition, and molecular composition of the droplet by detecting light passing through the droplet at a specified position. The detection device 104 is coupled to the second switching device 1041, so that individual control of each detection device 104 can be realized to save energy consumption. The detection device 104 may specifically be a PIN photosensitive device.

In an embodiment, the first switching device 1031 and the second switching device 1041 both adopt an oxide thin film transistor, and film layer of both devices are disposed in a same layer and made of a same material.

It should be noted that the first switching device 1031 and the second switching device 1041 both adopt an oxidized thin film transistor, which has a higher signal-to-noise ratio, so that the interference of the switching devices on the detection device 104 can be avoided. Because the generated ultrasonic waves are adopted to promote the splitting of the droplet in the embodiment of the present disclosure, the switching devices do not need to have higher high-voltage-resistance performance, the smaller the off-state current of the oxide thin film transistor serving as the switching device is, the better the control on the gate electrode is, the unnecessary leakage current can be avoided, and the energy consumption can be saved. Meanwhile, respective film layers of the first switching device 1031 and the second switching device 1041 may be disposed in the same layer and have the same material, which may reduce the difficulty of the manufacturing process and may reduce the thickness of the microfluidic substrate. It should be noted that when the first switching device 1031 and the second switching device 1041 are disposed in the same layer, an insulating layer needs to be disposed therebetween to avoid short circuit and electric leakage.

In an embodiment of the present disclosure, in addition to the above structure, the microfluidic substrate further includes a lyophobic layer 105 on a side of the ultrasonic structure 102 away from the substrate 101.

It is noted that the droplet to be split is disposed on the side of the lyophobic layer 105 away from the substrate 101. The lyophobic layer 105 can prevent the droplet from directly contacting the second electrode layer 103 causing electric leakage or corrosion of the second electrode layer 103. The lyophobic layer 105 may be polytetrafluoroethylene, i.e., Teflon.

In an embodiment, the second electrode 1030 is coupled to a first signal line; the first electrode 120 is coupled to a second signal line; and the first signal line and the second signal line are arranged in a same layer and are made of a same material.

It should be noted that the first signal line may input a first electric signal, the first electric signal is applied to the second electrode 1030, and the second electrode 1030 controls lyophobicity of the lyophobic layer 105 through the first electric signal applied thereto, so as to control the splitting of the droplet. The second signal line may input a second electric signal, the second electric signal is applied to the first electrode 1020, and the first electrode 1020 controls the ultrasonic wave structure 102 to generate the ultrasonic waves at a specified position through the second electric signal applied thereto, so as to promote the splitting of the droplet and reduce the voltage for controlling the splitting of the droplet. The first signal line and the second signal line may be arranged in a same layer and are made of a same material, and may share a set of mask plate, so that the manufacturing cost can be saved. Of course, if the wiring density is too high, the first signal line and the second signal line may be disposed in different layers, and an insulating layer may be disposed therebetween. The first signal line and the second signal line are not shown in the figures because of the large number of the first signal line and the second signal line.

It can be understood from FIGS. 2, 3 and 4 that the upper substrate of the microfluidic chip has a simpler structure relative to the lower substrate, and the upper substrate includes fewer optical devices and electrical devices. Therefore, the scheme that the ultrasonic structure 102 is disposed on the upper substrate of the microfluidic chip in the embodiments of the present disclosure facilitates integration of the ultrasonic structure 102, and reduces the difficulty of the manufacturing process.

Figure 5:
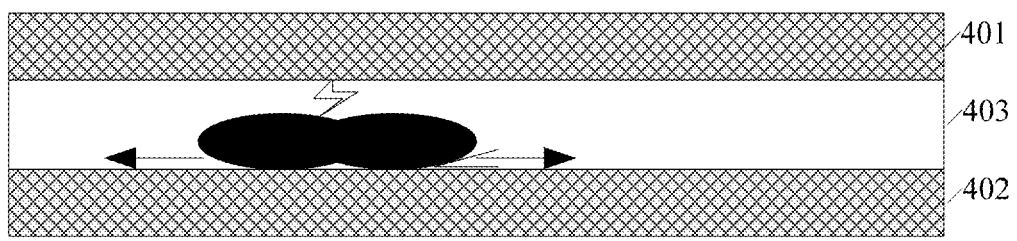
FIG. 5 is a schematic structural diagram of a microfluidic chip according to an embodiment of the present disclosure.

An embodiment of the disclosure provides a microfluidic chip. FIG. 5 is a schematic structural diagram of a microfluidic chip according to an embodiment of the present disclosure, and as shown in FIG. 5, the microfluidic chip includes an upper substrate 401 and a lower substrate 402. In an embodiment, the microfluidic substrate according to embodiments of the present disclosure (as shown in FIGS. 2 and 3) may serve as the upper substrate 401, in which case the upper substrate 401 further includes an optical device for generating light towards the droplet and the lower substrate 402 includes the detection device 104. Alternatively, the microfluidic substrate according to embodiments of the present disclosure (as shown in FIG. 4) may serve as the lower substrate 402. In this case, the upper substrate 401 may include an optical device for generating light towards the droplet. A cavity 403 is formed between the upper substrate 401 and the lower substrate 402, and the cavity 403 is used for accommodating the droplet to be split. In an embodiment, the upper substrate 401 and the lower substrate 402 are provided with a lyophobic layer on sides thereof adjacent to the droplet, respectively.

The implementation principle of the microfluidic chip is similar to that of the microfluidic substrate provided in any of the above embodiments, and details are not repeated here.

An embodiment of the disclosure provides a micro total analysis system, which includes the micro fluidic chip provided by any of the above embodiments. The micro total analysis system can realize the analysis of data such as the position, chemical composition, and molecular composition of the droplet. The implementation principle of the micro total analysis system is similar to that of the microfluidic substrate provided in any of the above embodiments, and details are not repeated here.

It will be understood that the above embodiments are merely exemplary embodiments employed to illustrate the principles of the present disclosure, and the present disclosure is not limited thereto. It will be apparent to those skilled in the art that various changes and modifications can be made therein without departing from the spirit and scope of the disclosure, and these changes and modifications are to be considered within the scope of the disclosure.

What is claimed is:

1. A microfluidic substrate, comprising
 a substrate;
 an ultrasonic structure on the substrate and comprising a first electrode layer and a material layer that are arranged in sequence in a direction away from the substrate,
 a second electrode layer on the substrate, wherein the second electrode layer comprises a plurality of second electrodes spaced apart from each other, and each of the plurality of second electrodes are configured to, when being applied with a second voltage, control a droplet on a respective one of the plurality of second electrodes to be split, wherein
 the first electrode layer comprises a plurality of first electrodes spaced apart from each other,
 the ultrasonic structure is configured to generate ultrasonic waves when a first voltage is applied to a corresponding one of the plurality of first electrodes, so as to vibrate the droplet during a splitting process of the droplet, and wherein the plurality of first electrodes and the plurality of second electrodes are in a same layer, are made of a same material, and are alternately arranged.

2. The microfluidic substrate of claim 1, wherein the material layer comprises polytetrafluoroethylene.

3. The microfluidic substrate of claim 1, wherein the material layer comprises vinylidene fluoride (VDF) homopolymer.

4. The microfluidic substrate of claim 1, wherein the material layer comprises a copolymer of vinylidene fluoride and fluorine-containing vinyl monomer.

5. The microfluidic substrate of claim 1, wherein each of the plurality of second electrodes is coupled to a first switching device.

6. The microfluidic substrate of claim 5, further comprising a detection device on a side of the second electrode layer close to the substrate and a second switching device coupled to the detection device, the detection device being configured to detect light passing through the droplet.

7. The microfluidic substrate of claim 6, wherein each of the first switching device and the second switching device is an oxide thin film transistor, a film layer of the first switching device and a respective film layer of the second switching device are in a same layer and are made of a same material.

8. The microfluidic substrate of claim 1, further comprising a lyophobic layer on a side of the ultrasonic structure away from the substrate.

9. The microfluidic substrate of claim 8, wherein each of the plurality of second electrodes is coupled to a first signal line and each of the plurality of first electrodes is coupled to a second signal line, and the first signal line and the second signal line are in a same layer and are made of a same material, and wherein the second electrode is configured to control lyophobicity of the lyophobic layer through the first electric signal applied thereto, and the first electrode is configured to control the ultrasonic structure to generate the ultrasonic waves at a specified position through the second electric signal applied thereto.

10. A microfluidic chip, comprising the microfluidic substrate of claim 1 and a lower substrate, wherein
the droplet is accommodated between the microfluidic substrate and the lower substrate,
the microfluidic substrate further comprises an optical device configured to generate light towards the droplet; and
the lower substrate comprises a detection device configured to detect light passing through the droplet.

11. A microfluidic chip, comprising the microfluidic substrate of claim 1 and an upper substrate, wherein
the droplet is accommodated between the microfluidic substrate and the upper substrate,
the upper substrate comprises an optical device configured to generate light towards the droplet; and
the microfluidic substrate further comprises a detection device configured to detect light passing through the droplet.

12. A micro total analysis system, comprising the microfluidic chip of claim 10.

13. A micro total analysis system, comprising the microfluidic chip of claim 11.

* * * * *